(12) United States Patent
Naghian

(10) Patent No.: US 8,072,906 B2
(45) Date of Patent: Dec. 6, 2011

(54) SIGNAL PROPAGATION DELAY ROUTING

(75) Inventor: Siamak Naghian, Espoo (FI)

(73) Assignee: Intellectual Ventures I LLC, Wilmington, DE (US)

( * ) Notice: Subject to any disclaimer, the term of this patent is extended or adjusted under 35 U.S.C. 154(b) by 420 days.

(21) Appl. No.: 10/526,565

(22) PCT Filed: Aug. 11, 2003

(86) PCT No.: PCT/IB03/03736
§ 371 (c)(1),
(2), (4) Date: Apr. 5, 2005

(87) PCT Pub. No.: WO2004/023740
PCT Pub. Date: Mar. 18, 2004

(65) Prior Publication Data
US 2006/0007863 A1    Jan. 12, 2006

(30) Foreign Application Priority Data
Sep. 5, 2002 (GB) .................................. 0220660.5

(51) Int. Cl.
*H04L 12/28* (2006.01)
(52) U.S. Cl. ........ 370/255; 370/328; 370/386; 370/238; 455/440; 455/445
(58) Field of Classification Search .......... 370/229–230, 370/235, 238, 252–256, 310.1–313, 328, 370/338, 386–393, 432; 455/403, 418–425, 455/427–430, 432–445, 450–457
See application file for complete search history.

(56) References Cited

U.S. PATENT DOCUMENTS

| | | | | |
|---|---|---|---|---|
| 4,569,042 A * | 2/1986 | Larson | ........................... | 370/250 |
| 4,873,517 A * | 10/1989 | Baratz et al. | ................... | 370/236 |
| 5,450,394 A * | 9/1995 | Gruber et al. | ................. | 370/253 |
| 5,583,996 A * | 12/1996 | Tsuchiya | ........................ | 709/218 |
| 5,793,976 A * | 8/1998 | Chen et al. | ..................... | 709/224 |
| 5,812,528 A * | 9/1998 | VanDervort | ................... | 370/235 |
| 5,878,032 A * | 3/1999 | Mirek et al. | ................... | 370/252 |
| 5,883,891 A * | 3/1999 | Williams et al. | ............... | 370/356 |
| 5,936,940 A * | 8/1999 | Marin et al. | .................... | 370/232 |

(Continued)

FOREIGN PATENT DOCUMENTS
EP    1 433 291 B1    5/2007
(Continued)

OTHER PUBLICATIONS

Japanese Search Report for application No. 2004-533727, received Oct. 29, 2007.

(Continued)

*Primary Examiner* — Pablo Tran

(57) ABSTRACT

A method of routing a message from a source node to a destination node in an adhoc wireless network comprising a plurality of nodes, comprising the steps of; transmitting a first message from the source node to the destination node, receiving said first message at said destination node, transmitting a second message from said destination node in response to the first message and, wherein at least one of said first message and said second message is sent between the source and destination nodes via a plurality of paths comprising at least one intermediate node, selecting a path for communication between the source node and the destination node using an indication of the time taken for at least one of said second and first messages to propagate between each node on each path.

27 Claims, 4 Drawing Sheets

U.S. PATENT DOCUMENTS

| | | | |
|---|---|---|---|
| 5,987,011 A | 11/1999 | Toh | |
| 6,115,580 A * | 9/2000 | Chuprun et al. | 455/1 |
| 6,643,267 B1 * | 11/2003 | Karia et al. | 370/252 |
| 6,744,740 B2 * | 6/2004 | Chen | 370/255 |
| 6,791,949 B1 * | 9/2004 | Ryu et al. | 370/254 |
| 6,920,155 B2 | 7/2005 | Rao | |
| 6,925,062 B2 * | 8/2005 | Tanaka et al. | 370/241.1 |
| 7,027,426 B2 | 4/2006 | Billhartz | |
| 7,092,410 B2 * | 8/2006 | Bordonaro et al. | 370/516 |
| 7,248,841 B2 * | 7/2007 | Agee et al. | 455/101 |
| 7,733,794 B2 * | 6/2010 | Damm | 370/252 |
| 7,826,374 B2 * | 11/2010 | Frei | 370/238 |
| 2002/0013856 A1 | 1/2002 | Garcia-Luna-Aceves et al. | |
| 2002/0172157 A1 * | 11/2002 | Rhodes | 370/238 |
| 2003/0026268 A1 * | 2/2003 | Navas | 370/400 |
| 2003/0048771 A1 * | 3/2003 | Shipman | 370/351 |
| 2003/0076840 A1 * | 4/2003 | Rajagopal et al. | 370/395.21 |
| 2004/0095891 A1 * | 5/2004 | Nakagawa | 370/252 |
| 2004/0190476 A1 * | 9/2004 | Bansal et al. | 370/338 |
| 2004/0218548 A1 * | 11/2004 | Kennedy et al. | 370/254 |
| 2004/0233881 A1 * | 11/2004 | Kang et al. | 370/338 |
| 2005/0078672 A1 * | 4/2005 | Caliskan et al. | 370/389 |
| 2005/0111428 A1 * | 5/2005 | Orlik et al. | 370/344 |
| 2005/0190717 A1 * | 9/2005 | Shu et al. | 370/328 |
| 2005/0220054 A1 * | 10/2005 | Meier et al. | 370/331 |
| 2005/0249122 A1 * | 11/2005 | Wheeler et al. | 370/241 |
| 2006/0067282 A1 * | 3/2006 | Sherman et al. | 370/338 |
| 2006/0092855 A1 * | 5/2006 | Chiu | 370/254 |
| 2006/0128315 A1 * | 6/2006 | Belcea | 455/67.11 |
| 2006/0268792 A1 * | 11/2006 | Belcea | 370/338 |
| 2007/0053299 A1 * | 3/2007 | Khan et al. | 370/238 |

FOREIGN PATENT DOCUMENTS

| | | |
|---|---|---|
| JP | 11-032073 | 2/1999 |
| JP | 2001-268127 | 9/2001 |
| JP | 2002-171283 | 6/2002 |
| JP | 2003-032447 | 1/2003 |
| JP | 2004-048478 | 2/2004 |
| JP | 2004-064678 | 2/2004 |
| WO | WO 99/46899 | 9/1999 |
| WO | WO 01/31878 | 5/2001 |
| WO | WO 01/41377 | 6/2001 |
| WO | WO 01/50657 | 7/2001 |
| WO | WO 03/028315 | 4/2003 |
| WO | WO 2004/015904 | 2/2004 |

OTHER PUBLICATIONS

Chinese Search Report for application No. 03824261.3, mailed Mar. 28, 2008.

Office Action from CN Application 03824261.3, mailed Jul. 24, 2009 (with English translation).

Communication from the European Patent Office for EP Application 03 793 960.0, mailed Sep. 24, 2009.

* cited by examiner

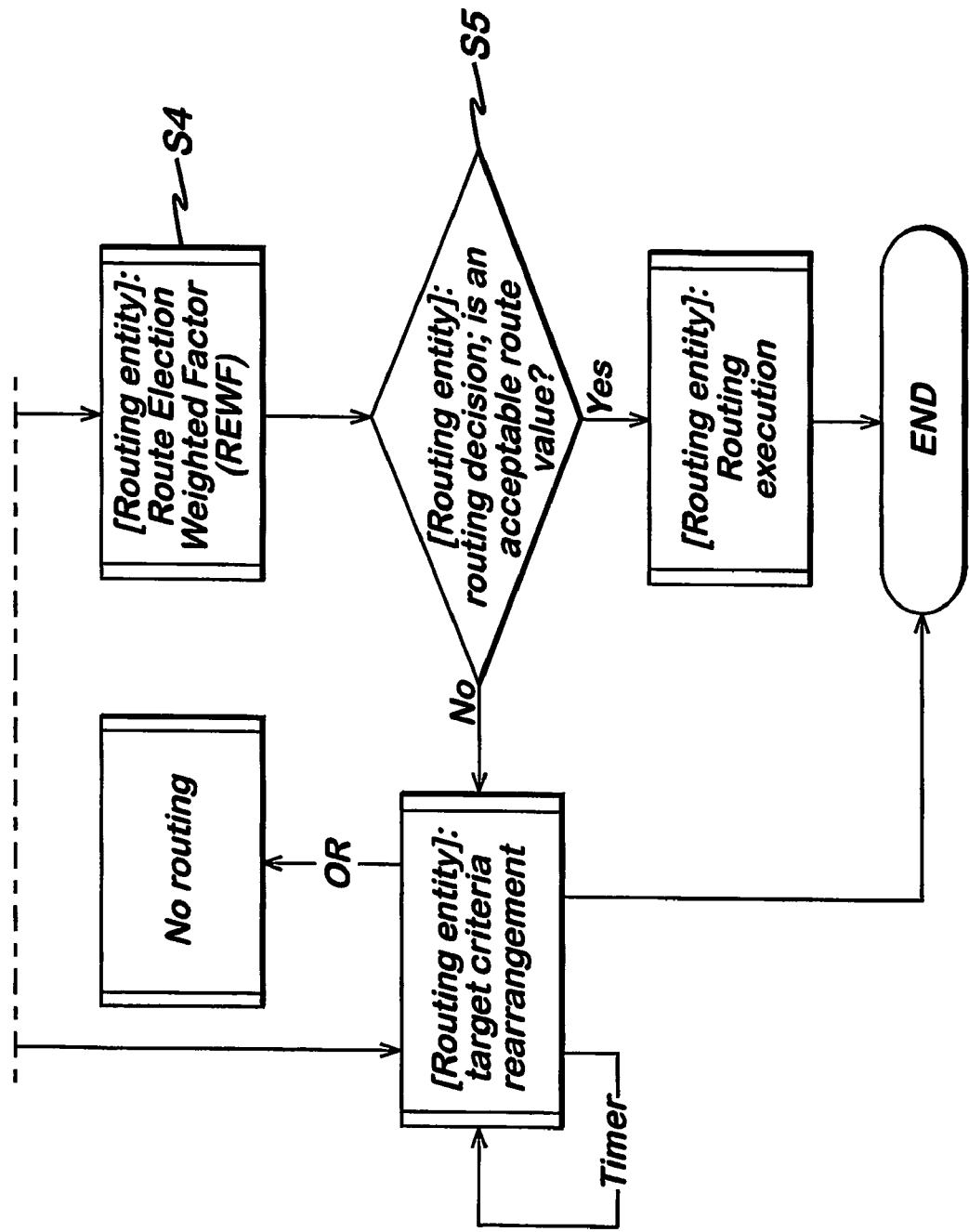
Fig. 4 (Contd.)

SIGNAL PROPAGATION DELAY ROUTING

FIELD OF THE INVENTION

The present invention relates to a method and apparatus for providing a routing mechanism in an ad-hoc network.

BACKGROUND OF THE INVENTION

FIG. 1 is a diagram of an ad hoc network. An ad hoc network comprises nodes, such as mobile stations that can communicate directly with each other, without the use of a centralised access point. In such a network all nodes behave as routers. Since the nodes are free to move randomly the topology of the network changes with time. Data from a source node (1) (the terminal that is sending data) is sent to a destination node (2) (the terminal that is receiving the data), via intermediate nodes which forward the data from the source node to the destination node. Determining the route by which data is sent from the source node to the destination node is achieved by selecting which intermediate nodes are used to forward the data. This is known as routing.

Different routing protocols for ad hoc networks are currently known. These routing protocols can be classified as: 'table driven' and 'on demand' routing, otherwise known as 'proactive' and 'reactive' routing, respectively. In table driven protocols, each node maintains one or more tables containing outing information to other nodes in the network. These tables are updated using periodic transmissions between nodes so as to change with the topology of the network. Examples of table driven routing protocols include Dynamic Destination Sequenced Distance Vector Routing Protocol (DSDV), Global State Routing (GSR) and Wireless Routing Protocol (WRP). In contrast, on demand routing protocols invoke route discovery mechanisms only when a route is needed. Examples of on demand routing protocols include Ad Hoc On Demand Distance Vector Routing (AODV), Dynamic Source Routing (DSR), Temporally Ordered Routing Algorithm (TORA) and Associativity Based Routing (ABR).

In the DSDV protocol, every mobile station maintains a routing table that lists all available destinations, the number of hops to reach the destination and the sequence number assigned by the destination node. The sequence number is used to distinguish old routes from new ones and thus avoid the formation of loops. The mobile stations periodically transmit their routing tables to their immediate neighbours. A station also transmits its routing table if a significant change has occurred in its table from the last update sent. Therefore, the update is both time driven and event driven. The routing table updates can be sent in two ways; either by sending the full routing table to the neighbours or by incrementally updating entries that have changed since the last update.

Ad hoc On-demand Distance Vector routing (AODV) is an improvement on the DSDV algorithm. AODV minimises the number of broadcasts by creating the routes on demand as opposed to DSDV that maintains the list of all the routes.

To find a path to the destination node, the source node broadcasts a route request message. The neighbouring nodes in turn broadcast the message to their neighbours until it reaches an intermediate node that has recent route information about the destination node, or until the message reaches the destination. A node discards a route request message that it has already seen. The route request message uses sequence numbers to ensure that the routes are loop free and to ensure that if the intermediate nodes reply to the route request message, they will reply with the most recent information only.

When a node forwards a route request message to neighbouring nodes, it also records in its tables the node from which the first copy of the request came. This information is used to construct the reverse path for the route reply, or acknowledgement message. AODV uses only symmetric links because the route reply message follows the reverse path of the route request message. As the route reply message traverses back to the source node, the nodes along the path enter the forward route into their tables.

Mobile device positioning is an important requirement of any telecommunications system and is an existing feature in both ad hoc and cellular networks. The Federal Communications Commission (FCC) requires wireless service providers to support a detailed positioning mechanism. Positioning information of a mobile station may be used for many purposes:

pricing of calls may be based on the position of a mobile station, whereby calls made from the home area, for example, may be cheaper;

when an emergency call is placed from a mobile station, it is possible to determine the position of the mobile station;

the user of a mobile station may need information about his/her location e.g. when travelling;

the authorities can use the positioning information to locate a stolen mobile station or to trace a missing person, for example.

Generally, positioning methods are based on the propagation characteristics of a radio wave signal sent to or from the mobile station, using the delay and direction of the signal between the transmitter and the receiver to determine a position. Therefore, the accuracy and complexity of such methods are inclined dependent on the characteristics of the radio channel. Many different positioning methods have been developed for mobile positioning. They can be categorized based on the way they utilize the radio signal characteristics for determining the location of the mobile station.

Classifications of methods used to determine position include:

Cell_ID-based positioning
Round Time Trip (RTT)
Time Of Arrival (TOA)
Different Time Of Arrival (DTOA)
Angle Of Arrival (AOA)
Signal strength-based such as Reference Node-Based Positioning (also called local positioning)

Positioning methods may also incorporate any combination of these methods.

In a TOA method, the location calculation is based on the propagation delay of a signal from a transmitter to a receiver. By measuring the time of arrival of signals from three transmitters at a receiver, the position of the receiver can be calculated using triangulation techniques that are well known in the art.

The above-mentioned ways of calculating the position of a mobile station can be utilized in various systems such as cellular systems, purely location systems, or any similar systems. Presently, the most popular positioning system is Global Positioning System (GPS). Positioning features are extending to the cellular systems such as Global System for Mobile Communications (GSM), Universal Mobil Telecommunication System (UMTS) and International Mobile Telecommunications 2000 (IMT2000).

GPS is the most popular position location system due to its accuracy and worldwide availability. GPS consists of a constellation of satellites in orbit above the Earth. GPS position determination is based on the arrival times, at a receiver at the mobile station, of precisely timed signals from the satellites that are above the user's radio horizon. Each satellite uses an atomic clock to record the time at which the signal is sent. An accurate clock at the receiver measures the time delay between the signals leaving the satellites and arriving at the receiver. This allows the calculation of the distance of the mobile station to each satellite. If three satellites are visible to the receiver, triangulation can be used to find the location of the mobile station. If a fourth satellite is used, the receiver may also calculate its latitude. Since the clock in the receiver is not as accurate as the atomic clocks in the satellite the calculation of the distance from each satellite will have a standard error, which prevents the spheres calculated during triangulation from intersecting at the same point. The receiver therefore can calculate the distance adjustment that will cause the four spheres to intersect at one point. This allows it to adjust its clock to adjust its measure of distance. For this reason, a GPS receiver actually keeps extremely accurate time, on the order of the actual atomic clocks in the satellites. Currently, the Standard Positioning Service offered by GPS provides a positioning accuracy of 100 meters horizontally and 156 meters vertically and time transfer accuracy to UTC within 340 nanoseconds (95 percent).

SUMMARY OF THE INVENTION

It is an aim of this invention to provide a method for improving current routing algorithms.

According to a first aspect of the present invention there is provided a method of routing a message from a source node to a destination node in an adhoc wireless network comprising a plurality of nodes, comprising the steps of; transmitting a first message from the source node to the destination node, receiving said first message at said destination node, transmitting a second message from said destination node in response to the first message and wherein at least one of said first message and said second message is sent between the source and destination nodes via a plurality of paths comprising at least one intermediate node, selecting a path for communication between the source node and the destination node using an indication of the time taken for at least one of said second and first messages to propagate between each node on each path.

According to a second aspect of the invention, there is provided an ad hoc wireless network comprising a plurality of nodes wherein a source node is arranged to transmit a first message to a destination node, said destination node is arranged to receive the said first message, said destination node is arranged to transmit a second message in response to said first message and at least one intermediate node is arranged to transmit at least one of said first message and said second message via a plurality of paths. Said network further comprising selecting means arranged to select at least one of said plurality of paths for communication between said source node and said destination node using an indication of the time taken for at least one of said second and first messages to propagate between each node on each path.

According to a third aspect of the present invention there is provided a node in an ad hoc wireless network, said ad hoc network comprising a plurality of nodes, said node comprising: means for receiving and transmitting at least one of a plurality of messages sent on a plurality of communication paths; means for indicating the time said at least one message is received at the node; and means for indicating the time said message is transmitted from the node.

BRIEF DESCRIPTION OF THE DRAWINGS

Embodiments of the present invention will now be described by way of example with reference to the accompanying drawings, in which.

DETAILED DESCRIPTION OF EMBODIMENTS OF THE INVENTION

Figure 1:
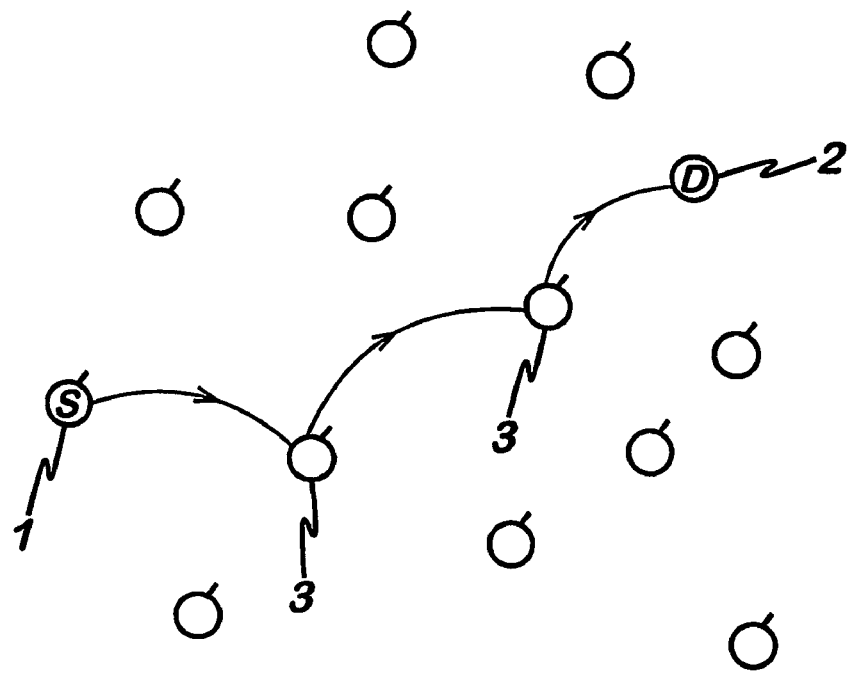
FIG. 1 is a diagram of a MANET (mobile ad hoc network) network.

FIG. 1 shows an example of a mobile ad hoc network according to the present invention. The mobile ad hoc network will hereinafter be referred to as MANET, which is a popular abbreviation used in this field to indicate these types of networks. It can be seen that the MANET network is comprised of a plurality of network nodes 3, each node having at least one radio transceiver for transmitting and/or receiving from a neighbour node. FIG. 1 represents a snapshot of a MANET network at a particular instance in time, because by definition the ad hoc nature of such network means that the topology shown in FIG. 1 is expected to change dynamically over time. That is, the nodes 3 in a MANET network are free to move.

Data is transmitted across the network using a packet switched system where data packets are routed through a communications network on a "hop by hop" basis to reach their final destination. The Internet protocol (IP) is one embodiment of a protocol, which can be used to transfer packets across a MANET network. The Internet protocol is predominantly concerned with the network layer of the open system interconnection (OSI) model and as such overcomes the vendor specific limitations of certain communication devices operating at the lower levels, i.e. the physical or application layers.

Measurements of the time for a signal to propagate, hereinafter referred to as the signal propagation delay (SPD) may be based on the Time of Arrival (TOA) or the Round Trip Time (RTT) of a radio signal. In this context, the TOA refers to the time for a signal to propagate from the source (transmitter) node to the destination or intermediate (receiver) node. More specifically the TOA may refer to the time between when the start of the radio signal or data frame at a transmitter node (e.g. the source node) is transmitted to when the beginning (the first significant path) of the corresponding signal/frame is received at the receiver node (e.g. the destination node or intermediate node). The RTT on the other hand, is defined as the time for a signal to propagate from the source node to the destination and return to the source node.

The time between when a message is sent from the source (transmitter) node to when a corresponding message returns to the source node is not the actual round trip time for the signal to propagate. This is because there is an unknown time offset between the reception and transmission of a signal at each node. In accordance with an embodiment of the present invention, each intermediate node reports an indication of the time offset between receiving and transmitting a message, in order for the exact signal propagation time to be established. The manner by which this may be achieved will now be discussed.

Figure 2:
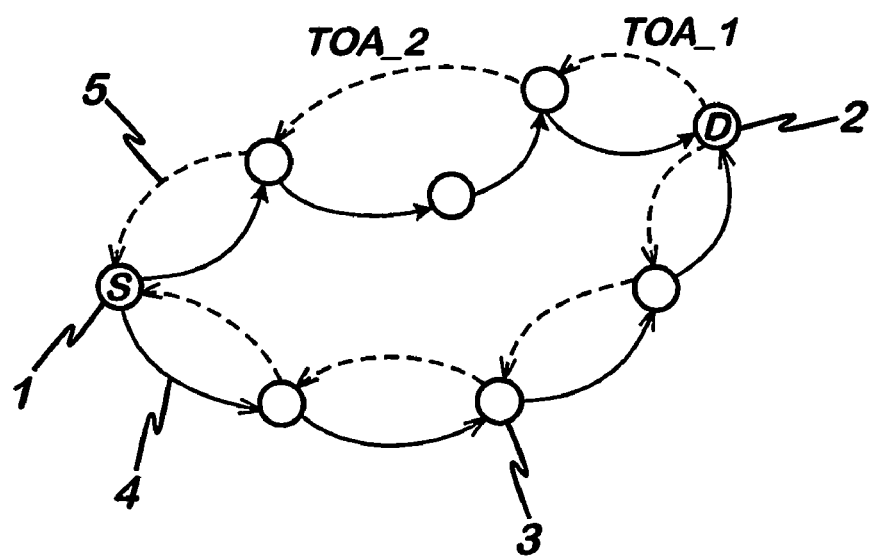
FIG. 2 is a diagram of a MANET network in accordance with an embodiment of the present invention.

As shown in FIG. 2 a source node 1 initiates a route discovery by sending a route discovery/request message 4 to neighbouring nodes. The route discovery/request message may be sent in accordance with any of the routing protocols described above. As such the route discovery/request message may be 'table driven' or sent 'on demand'. For example, on receipt of the route discovery/request message the neighbouring nodes in turn broadcast the message until the message reaches an intermediate node that has recent route information about the destination node by which the message is then routed, or until it reaches the destination. A node discards a route request message that it has already seen. When an intermediate node forwards a route discovery/request message to its neighbours, it may also record in its tables the node from which the first copy of the request came. This information is used to construct the reverse path for the route reply packet.

In one embodiment of the present invention, the route discovery/request message includes a metrics field for storing an indication of the time that the message is received by and transmitted from each node on the path to the destination node. Recording the time of transmission and reception of the message is known as time stamping the message. The manner in which these measurements are used for routing will be described in detail herein after.

In order for the timestamps included in the metrics field of the message to be used in routing protocols of embodiments of the present invention, it is necessary for a clock in each node to be synchronized with the rest of the nodes within the established adhoc network. The synchronization could be accomplished when a node registers with the adhoc network, for example, at the time of network entry. In this case, network-aided synchronization is part of the network functionality. In addition, nodes may use other references, such as GPS for synchronization purposes. When utilizing GPS reference, each node may include a GPS receiver, which allows the clock in the receiver to be adjusted in relation to the atomic clocks in GPS satellites, thus allowing the clock in the receiver to have an accuracy equivalent to an atomic clock.

Figure 3:
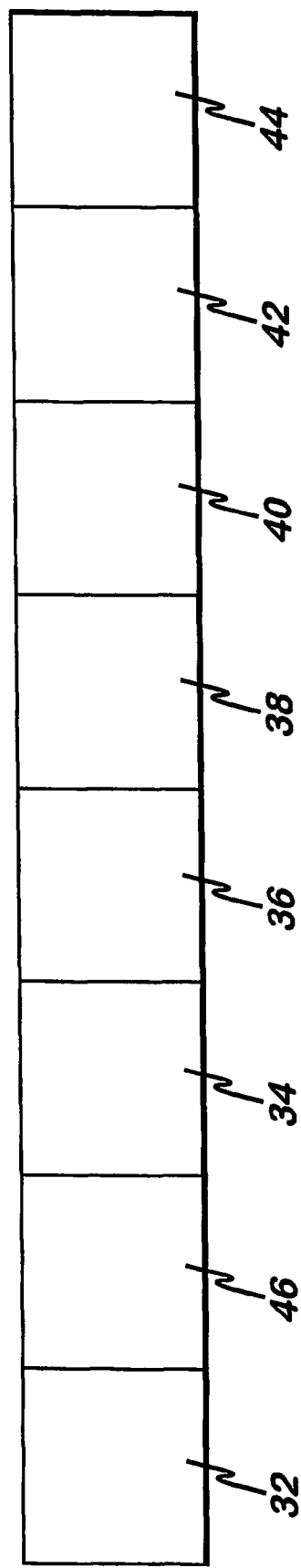
FIG. 3 is a diagram of the basic frame structure of a message in accordance with an embodiment of the present invention.

On receipt of the route discovery/request message at the destination node 2, the destination node creates an acknowledgement message that includes a precise indication of the time at which the acknowledgment message is sent from the destination node. The basic frame structure of an acknowledgement and a route discovery/request message is shown in FIG. 3. The message may include a 'type'—field 32, address fields including the destination IP address 34 and the source IP address 36, a life time field 38, a metrics field 40, a request identification 46, a destination node Sequence Number (SN) 42 and a source node Sequence Number (SN) 44. The 'type' field specifies whether the message is an acknowledgement message or a route discovery/request message. The timestamps included in the message may be stored in the metrics field 40 of the message.

In an embodiment of the present invention acknowledgement message will be created on receipt of each route discovery message received at the destination node. Each acknowledgement message will propagate through the MANET network by tracing the path of the route discovery message it is sent in reply to, using the information stored in the tables of each intermediate node 3.

An acknowledgment message will first be sent from the destination node to the last intermediate node on the path between the source node and the destination node. On receipt of the acknowledgement message the intermediate node records the time of arrival of the acknowledge message.

In one embodiment of the present invention, the intermediate node compares the time stamp contained in the acknowledgement message to the time of arrival of the acknowledgement message at the intermediate node, in order to calculate the signal propagation delay across path TOA1.

The calculated signal propagation delay for path TOA1 is stored in the metrics field of the acknowledgement message. Immediately before the message is routed to the next intermediate node, the transmitting intermediate node timestamps the message. The acknowledgement message is then routed to the next intermediate node using routing information stored in the table, which recorded the node from which the first copy of the route discovery message came.

On receipt of the acknowledgement message by the next intermediate node, the node measures the time of arrival of the acknowledgement message and compares it to the time stamp included in the message indicating when the message was transmitted from the previous node, in order to calculate the signal propagation delay TOA2. The measured signal delay cross path TOA2 is then stored in the acknowledgement message. The signal delay across path TOA2 may be added to the signal delay across path TOA1, or it may be stored separately in the metrics field. This process continues as the acknowledgement message is routed across the MANET network by the intermediate nodes, until it arrives at the source node 1.

The source node will receive an acknowledgement message in reply to each of the route discovery messages, which were received by the destination node. Each acknowledgement message will contain information of the signal propagation delay between each intermediate node on the route between the destination node and the source node. As previously described, the signal propagation delay for each 'hop' of the message path may be stored separately in the acknowledgement message or added together.

In an alternative embodiment of the present invention the intermediate nodes that route the acknowledgement message from the destination node to the source node each time stamp the message at the moment the message is received and when the message is transmitted. The time taken for the message to propagate over each hop of the message path can then be calculated at the source node from the time stamps contained in each acknowledgement message.

When added together, the sum of the signal propagation delay over the total number of radio channel hops on the acknowledgement message path will be less than the signal propagation delay of the entire journey of the acknowledgement message from the destination node to the source node. This is since the total length of time for the signal to propagate from the destination node to the source node includes the time taken to process the signal at each node in addition to the time taken for the signal to propagate between each node.

This information relating to the signal delay for each hop in an acknowledgement message path may be stored on the routing table of the nodes. In the case of a hybrid network solution, with overlaid backbone (such as cellular) and local proximity adhoc networks, this information may partly stored and/or process at a server or other network element. This information may be used for mobility management (handover), call admission, and other function of radio resource management as well as for supporting the local adhoc functions. For each destination node a table may contain information for each route acknowledged by acknowledgement messages 5. Since each acknowledgement message contains a time stamp from when the acknowledge message was sent from the destination node, the time of the total journey for the message to reach the source node from the destination node may be calculated. This may be stored in addition to the signal delay for each hop, including the processing delay, for a particular route to a destination node.

In an alternative embodiment of the present invention, the timestamps included in the metrics field of the message are used to calculate the time between the reception and transmission of the message at each node. This may then be subtracted from the time of the total journey for the message to reach the source node from the destination node in order to calculate the actual signal propagation delay.

In a preferred alternative embodiment, signal propagation delay measurement extracted in conjunction with route discovery message as well using the same approach as described previously. In this case, the destination node may process an algorithm to determine the shortest path to the source node.

The distance between each intermediate node used to route an acknowledgement message may be calculated from the signal propagation delay using the following equation;

$$D=ct$$

where D is the distance between a transmitting intermediate node and a receiving intermediate node corresponding to one 'hop' of the propagation path; c is the speed of light; and t is the signal propagation delay between the transmitting and receiving node. The distance between nodes on a route may be stored as an alternative, or in addition, to the time taken for the signal to propagate between each node of a particular route for use in a routing algorithm In a further embodiment of the present invention, the destination node may elect a set of the shortest paths when replying to request messages having signal propagation delay measurements stored in the metrics field. In an alternative embodiment the preliminary election by the destination node of a set of shortest paths may be based on the hop count, (i.e. the number of hops on a path) avoiding the overhead due to the SPD measurements. This approach is referred to as Destination node-Assisted Route Election (DARE). The final route election, may then be processed in source node based on the SPD measurements embedded in the acknowledge messages.

In a further embodiment of the present invention, the routing decision may be made iteratively. This means that a routing algorithm will select a route based on parameters such as hop count or RTT measurements, which can be obtained readily in order to accelerate the routing convergence at the time of routing creation. It can however keep a set of candidate routes in order to optimise the routing upon the first set up of the connection. This approach is referred to as Step-Wise Routing (SWR). In this approach, QoS (Quality of Service) classes are mapped to the routing candidates, providing the best available QoS for a certain period. For, example, real-time (RT) traffic such as speech is mapped into those route candidates, which have shortest time-to-convergence (i.e. the time taken for the source node to select a valid path to the destination node), highest link stability and the shortest paths. On the other hand, Non-Real-Time (NRT) traffic such as data can be allocated to those routes with longer time-to-convergence and longer paths.

Time stamping a message on receipt and transmission from a node allows the processing time taken by the intermediate nodes for a particular route to be calculated. This is particularly important for choosing routing paths, routed by intermediate nodes that use the least amount of power. When the total journey time for the acknowledgement message to propagate from the destination node to the source node is much greater than the sum signal propagation delay of the message across each hop of the route, it can be asserted that the time taken to process the message at the intermediate nodes is relatively high, (assuming that there is otherwise zero-interval between reception and transmission in each node). This would indicate that the intermediate nodes on the path use a relatively large amount of power to route the message.

Using a large amount of power to route an acknowledgement message is undesirable. Large power consumption may be due to a number of factors including using a relatively high number of intermediate nodes to route a message, or routing the message via nodes which take a long time to process the message. Therefore paths which have a relatively small difference between the total journey time and the sum propagation delay across each hop of the route may be selected by a routing algorithm to ensure that the selected paths route the message more efficiently.

In an alternative embodiment of the present invention power attributes may be used as additional parameters for making routing decisions. Such attributes include; the power available at an intermediate node for relaying the routing relating information and also user data associated with the routing function; the power needed for relaying and/or buffering the communication data; and the energy remaining in a nodes' battery. The power attributes can also appear as cost functions based on transmit power level on each hop on a route, to determine a low energy-consuming route between a pair of nodes.

Parameters, such as power incentive (by providing free services, fair fee, etc.) for adhoc sharing may also be included in power aspects.

Therefore in such an embodiment of the present invention, this information may be included in the metrics field of either the discovery/request message, or the acknowledgment message as it travels between the source node and the destination node to be used by the routing algorithm.

The stability of the radio channel over a specific path, or 'link' may also be used as a further parameter for making routing decisions. The longer the link is able to handle the best or requested QoS, the more stable the link. Link stability is closely related to the node mobility, which is discussed in more detail hereinafter. As the node mobility increases the probability of link being stable will most likely decrease. Handover indication can also show the level of the link stability/instability, that is, the more handover are happened the more instable will be the initiated link. Therefore in this particular embodiment of the present invention each route may be stored together with an indication of the link stability.

In an alternative embodiment of the present invention, signal propagation routing as described above may be applied to ad hoc networks wherein the nodes are moving at a common velocity. That is, the nodes are moving in a general direction. Such a situation could arise when the nodes are used on a train for example.

Position co ordinates of a node may be used to determine the velocity of a node. In one embodiment of the present invention, each node has a GPS receiver, by which each node may calculate its own position. In an alternative embodiment of the invention a node may calculate its position using cellular positioning such as Time of Arrival (TOA) and local positioning, also called Reference Node-Based Positioning (RNBP) method.

Cellular positioning methods are well known in the art and will not be described in detail herein. Using time stamped signals sent from three surrounding base stations, a node may calculate its distance from each base station based on the signal propagation delay from each base station. The location of the node may then be given by;

$$P(i)=((X(i)-x(m))2+(Y(i)-y(m))2+(Z(i)-z(m))2)1/2$$

where (X(i), Y(i), Z(i)) are the coordinates of each neighbouring base station, (x(m), y(m), z(m)) are the calculated distances of the node from each base station and P(i) is the location of the node.

In this embodiment of the invention, since each node is able to calculate its own position, each intermediate node on a message route may record its position in the acknowledgement message. By measuring a first set of position coordinates at a time T1 and a second set of position coordinates at a time T2. The velocity of a node is given by the equation;

$$V=(((x(m2)-x(m1))2+(y(m2)-y(m1))2+(z(m2)-z(m1))2)1/2)/\Delta T$$

where V is the velocity of the node, (x(m1), y(m1), z(m1)) are the first set of position coordinates of a node and (x(m2), y(m2), z(m2)) are the second set of position coordinates of a node and $\Delta T$ is the time between T1 and T2. This information can be updated in the same manner as signal propagation delay times are updated in the routing tables. However, as they may be subjected to the changes more frequent updating is desirable. In one embodiment of the present invention position coordinates are determined from information, which is already available through positioning mechanisms used for location-based services.

When the velocity measurements are known, nodes having the same velocity measurement are identified and grouped into sets. Routing may then only be implemented using nodes having the same velocity.

In an alternative embodiment of the present invention the movement of the node can also be interpreted from its signal strength, for example, if a node detects that the signal from another node is getting stronger, this may indicate that the nodes are getting closer together. In addition, an unchanged signal strength may indicate that the nodes are not moving relative to one another, or that the nodes are moving slowly. Movement patterns can be constructed based on the detected characteristics indicating movement, such as signal strength, and can be used in comparing the measured/obtained value with a target set and assessing the movement parameter. For adhoc networks with hybrid architecture, the movement of nodes relative to a trunk node may be detected. Router election could be based on the movement within the adhoc cell, depending on the node's movement towards or away from the trunk node, keeping the trunk node and the routers within the adhoc cell.

In an alternative embodiment of the present invention information relating to the number of data packets (control or user data) lost during a specific time span may be used as additional parameters for making routing decisions. It can be measured by, for example, Bite Error Ratio (BER) or Frame Error Rate (FER). A Medium Access Control (MAC) frame could be used as a reference, the size of which may be chosen to adapt to channel conditions. The packet loss may include both those packet lost over radio channel or due to lack of processing power at the node.

In a further embodiment of the present invention, received power or alternatively Signal to Noise Ratio at the receiver node may be used as a further parameter for making routing decisions. It can be measured based on ratio of the power of the required signal to that of the interference. Interference includes background noise and noise like interference from other users in the system.

In a further embodiment of the present invention, processing delay or load factor may be used in the routing algorithm. This indicates the time spent or needed for the node to process or buffer the relayed information. It also may refer to number of radio link in association with different routes.

In a further embodiment of the present invention, QoS may also be used in a routing algorithm. QoS Refers to how well the requested traffic attributes such as bit rate, service components, routing delay, etc. are met. QoS can be assessed based on the target QoS of a call/connection and the level of QoS providing by the link. For instance, the degree of requested bit rate can be considered in association with the length of hop when electing the candidate routes.

Due to the radio channel instability, using a single parameter for routing may not provide the best results in most circumstances. Therefore depending on the network environment and data traffic, a hybrid approach may be used to consider the importance of other parameters, which are important in routing election. An example of a routing algorithm used in an embodiment of the present invention will now be discussed in relation to FIG. 4.

Firstly, at step 1 (S1), measurements of at least some of the above mentioned parameters are made in the manner previously described. This information may already be available if there is a table driven routing approach used, in which case the information is retrieved from history data store 50. As described previously, this information may be stored in the nodes' cache memory in a distributed manner or can be held centrally in a server or network element.

At step 2 (S2), parameter measurements are used to select which parameters are to be used as routing criteria and to further set target values for the selected parameters. The target value for each parameter may be defined dynamically based on the system requirements, the radio network environment and the requested quality of service.

Further, at step 2 (S2), each parameter is also given a priority value $\eta_i$. At this step it is important to identify the key parameter that is to be taken into account when electing the route from the source to destination node. For example, if the signal delay is considered to be the most important parameter then, it will be given the highest priority value $\eta_i$. Parameter setting is a continuous process but it need not necessarily be repeated by each iteration of the algorithm. In an embodiment of the present invention it is possible to store the target values, priority values and other information relating to parameters in the history data store 50. However, the priority value should be defined dynamically for specific time span due to the instable radio channel characteristics. This may be used for routing and/or use in association with other functions accomplished in the network, for example location services, handover and network optimisation.

Once the priority values have been established, at step 3 (S3), a Route Election Weighted Factor for each parameter of each route path is calculated by multiplying $a_i$ (correlation with the target value), by the priority value $\eta_i$.

At step 4 (S4) the route election weighted factor (REWF) is calculated for each path, using the equation;

$$REWF = \sum_{i=1}^{n} a_i \cdot \eta_i \cdot k$$

where
$a_i$ is the output of target mapping for i'th criterion for each route path, $\eta_i$ is the priority value defined for each routing criterion in the routing algorithm, n is an integer and k is a normalization coefficient that can be predefined.

At step 5 (S5), based on REWF, the algorithm selects the best available route (or set of best routes; best, second best, third best, etc.). If there is no route available then the algorithm re-arranges the target sets (rearrangements for target values could be a option) for REWF determination within a specific time. The routing algorithm is then repeated using the new criteria. Alternatively, the algorithm may indicate that there are no routes available to meet the original target set.

Table 1 shows an example of calculated values using the routing algorithm described above.

second propagation delay of each of the plurality of paths, wherein the first path is selected based on the overall propagation delays.

5. The method of claim 4, further comprising calculating a processing delay of the first intermediate node for each of the plurality of paths, wherein the processing delay comprises a

TABLE 1

|  | Signal propagation delay | Power aspects | Link stability | Movement sheme | Location assistance Information | Packet loss | Signal strength/ Signal to Noise Ratio | Processing delay/ Load factor | Quality of Service attribute | Route Election Weighted Factor (REWF) |
|---|---|---|---|---|---|---|---|---|---|---|
| Route #1 | 5 | 4 | 4 | 3 | 2 | 4 | 4 | 3 | 2 | |
| Route #2 | 4 | 2 | 3 | 4 | 3 | 3 | 2 | 3 | 1 | |
| Route #N | | | | | | | | | | |
| Priority | 3 | 2 | 2 | 2 | 1 | 2 | 2 | 2 | 1 | |
| Route #1 | 15 | 8 | 8 | 6 | 2 | 8 | 8 | 6 | 2 | 0.63 |
| Route #2 | 12 | 4 | 6 | 8 | 3 | 6 | 4 | 6 | 1 | 0.50 |
| Route #N | 0 | 0 | 0 | 0 | 0 | 0 | 0 | 0 | 0 | 0.00 |

It is noted herein that while the above describes exemplifying embodiments of the invention, there are several variations and modifications which may be made to the disclosed solution without departing from the scope of the present invention as defined in the claims

The invention claimed is:

1. A method of routing a message in a network comprising a plurality of nodes, the method comprising:
   transmitting a first message from a source node to a destination node along a plurality of paths, wherein each of the plurality of paths includes a first intermediate node and a second intermediate node;
   receiving, at the source node, a plurality of second messages from the destination node, wherein each of the plurality of paths is traversed by one of the plurality of the second messages, and wherein each of the plurality of the second messages comprises:
      a first time stamp corresponding to receipt of the second message at the first intermediate node;
      a second time stamp corresponding to transmission of the second message from the first intermediate node to the second intermediate node;
      a third time stamp corresponding to receipt of the second message at the second intermediate node; and
      a fourth time stamp corresponding to transmission of the second message by the second intermediate node;
   calculating a propagation delay between the first intermediate node and the second intermediate node for each of the plurality of paths, wherein the propagation delay comprises a difference between the second time stamp and the third time stamp; and
   selecting a first path from the plurality of paths for communication between the source node and the destination node based at least in part on the propagation delays.

2. The method of claim 1, wherein each of the plurality of the second messages further comprises a fifth time stamp corresponding to receipt of the second message at a third intermediate node in communication with the second intermediate node.

3. The method of claim 2, further comprising calculating a second propagation delay for each of the plurality of paths, wherein the second propagation delay comprises a difference between the fourth time stamp and the fifth time stamp.

4. The method of claim 3, further comprising calculating an overall propagation delay for each of the plurality of paths based at least in part on a sum of the propagation delay and the second propagation delay of each of the plurality of paths, wherein the first path is selected based on the overall propagation delays.

5. The method of claim 4, further comprising calculating a processing delay of the first intermediate node for each of the plurality of paths, wherein the processing delay comprises a difference between the first time stamp and the second time stamp, and further wherein the first path is selected based at least in part on the processing delays.

6. The method of claim 1, further comprising:
   selecting the first path for communication between the source node and the destination node based at least in part on signal qualities of the plurality of paths, wherein each of the plurality of the second messages further comprises a signal quality at the first intermediate node.

7. The method of claim 1, further comprising:
   calculating a distance between the first intermediate node and the second intermediate node of each of the plurality of paths; and
   selecting the first path for communication between the source node and the destination node based at least in part on the calculated distances.

8. The method of claim 1, further comprising:
   calculating a velocity of the first intermediate node of each of the plurality of paths; and
   selecting the first path for communication between the source node and the destination node based at least in part on the calculated velocities.

9. The method of claim 1, further comprising:
   selecting the first path for communication between the source node and the destination node based at least in part on power attributes of the plurality of paths, wherein each of the plurality of the second messages further comprises a power attribute of the first intermediate node.

10. The method of claim 1, further comprising:
    assessing a link stability for each of the plurality of paths; and
    selecting the first path for communication between the source node and the destination node based at least in part on the assessed link stabilities.

11. The method of claim 1, further comprising:
    identifying a quality of service for a third message; and
    selecting the first path for communication between the source node and the destination node based at least in part on the identified quality of service.

12. The method of claim 8, wherein each of the plurality of the second messages further comprises:
    a first position of the first intermediate node at a first time; and
    a second position of the first intermediate node at a second time, and wherein calculating the velocity comprises using the first position and the second position.

13. The method of claim 1, further comprising using a routing algorithm to weight a parameter based on a priority value, wherein selecting the path for communication between the source node to the destination node is based at least in part on the weighted parameter.

14. The method of claim 1, further comprising using a mapping value to determine a degree to which a measured parameter value meets a predefined parameter value.

15. The method of claim 1, wherein the network is an ad hoc wireless network.

16. The method of claim 1, wherein the first intermediate node is a mobile station.

17. An ad hoc wireless network, comprising:
a plurality of nodes that form a plurality of paths between a source node and a destination node, wherein the source node is configured to transmit a first message to the destination node along the plurality of paths, and wherein the destination node is configured to send plurality of second messages to the source node in response to the first message, wherein each of the plurality of paths is traversed by one of the plurality of second messages;
a first intermediate node along the first path, wherein the first intermediate node is configured to generate a first time stamp corresponding to receipt of the second message at the first intermediate node and a second time stamp corresponding to transmission of the second message from the first intermediate node to a second intermediate node along the first path;
the second intermediate node configured to generate a third time stamp corresponding to receipt of the second message at the second intermediate node; and
selecting means configured to select the first path from the plurality of paths for communication between the source node and the destination node based at least in part on propagation delays between the first intermediate node and the second intermediate node of each of the plurality of paths, wherein the propagation delay comprises a difference between the second time stamp and the third time stamp.

18. The ad hoc network of claim 17, wherein the propagation delay is stored in the second message.

19. The ad hoc network of claim 17, further comprising:
means for measuring a signal quality of the second message for each of the plurality of paths;
wherein the selecting means is further configured to select the first path for communication between the source node and the destination node based at least in part on the measured signal qualities.

20. The ad hoc network of claim 17, further comprising:
processing means for calculating a distance between the first intermediate node and the second intermediate node for each of the plurality of paths;
wherein the selecting means is further configured to select the first path for communication between the source node and the destination node based at least in part on the calculated distances.

21. The ad hoc network of claim 17, further comprising:
processing means for calculating a velocity of the first intermediate node for each of the plurality of paths;
wherein the selecting means is further configured to select the first path for communication between the source node and the destination node based at least in part on the calculated velocities.

22. The ad hoc network of claim 17, further comprising:
means for measuring a power attribute of the first intermediate node for each of the plurality of paths;
wherein the selecting means is configured to select the first path for communication between the source node and the destination node based at least in part on the measured power attributes.

23. The ad hoc network of claim 17, further comprising:
means for determining a link stability for each of the plurality of paths;
wherein the selecting means is further configured to select the first path for communication between the source node and the destination node based at least in part on the link stabilities.

24. The ad hoc network of claim 17, further comprising:
means for identifying a quality of service of a third message;
wherein the selecting means is further configured to select the first path for communication between the source node and the destination node based at least in part on the quality of service.

25. The ad hoc network of claim 17, wherein:
the selecting means is configured to select a plurality of candidate routes;
the network further comprises mapping means for mapping the plurality of candidate routes to a plurality of quality of service classes; and
wherein the selecting means is further configured to select the first path from the plurality of candidate routes based at least in part on a quality of service of third message.

26. A node in an ad hoc wireless network, the node comprising:
means for transmitting a first message to a destination node along a plurality of paths, wherein each of the plurality of paths includes a first intermediate node and a second intermediate node;
means for receiving a plurality of second messages transmitted from the destination node along the plurality of paths, wherein each of the plurality of paths is traversed by one of the plurality of second messages, and wherein each of the second messages comprises:
a first time stamp corresponding to the time that the second message is received at the first intermediate node;
a second time stamp corresponding to the time that the second message is transmitted from the first intermediate node to the second intermediate node; and
a third time stamp corresponding to the time that the second message is received at the second intermediate node, wherein the first time, the second time, and the third time are stored in a metrics field of the message;
means for determining a propagation delay between the first intermediate node and the second intermediate node of each of the plurality of paths, wherein the propagation delay comprises a difference between the second time and the third time; and
means for selecting a first communication path for communication with the source node based at least in part on the propagation delays.

27. The node of claim 26, further comprising means for calculating a distance between the first intermediate node and the second intermediate node for each of the plurality of paths based at least in part on the propagation delay.

* * * * *

UNITED STATES PATENT AND TRADEMARK OFFICE
CERTIFICATE OF CORRECTION

| | | |
|---|---|---|
| PATENT NO. | : 8,072,906 B2 | Page 1 of 1 |
| APPLICATION NO. | : 10/526565 | |
| DATED | : December 6, 2011 | |
| INVENTOR(S) | : Naghian | |

Figure 4:
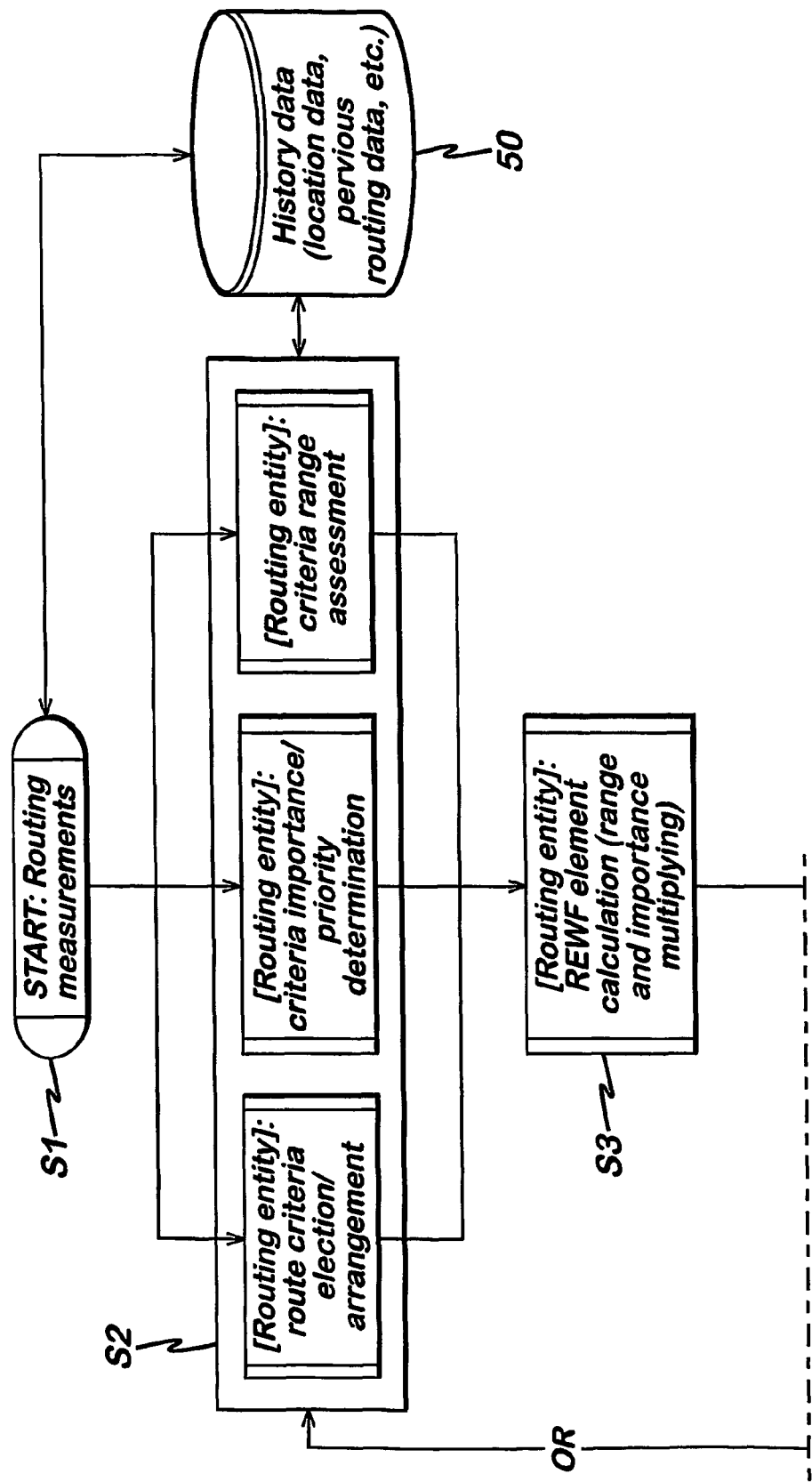
FIG. 4 shows a flow chart of a routing algorithm embodying an example of the present invention.

It is certified that error appears in the above-identified patent and that said Letters Patent is hereby corrected as shown below:

In the Drawings:

In Fig. 4, Sheet 3 of 4, for Tag "50", in Line 3, delete "pervious" and insert -- previous --, therefor.

In Fig. 4 (Contd.), Sheet 4 of 4, for Tag "S5", in Line 2, delete "decision;" and insert -- decision --, therefor.

In Column 1, Line 29, delete "outing" and insert -- routing --, therefor.

In Column 2, Line 61, delete "Mobil" and insert -- Mobile --, therefor.

In Column 11, in Table 1, delete "Movement sheme" and insert -- Movement scheme --, therefor.

In Column 11, Line 25, delete "claims" and insert -- claims. --, therefor.

In Column 13, Line 19, in Claim 17, delete "send" and insert -- send a --, therefor.

Signed and Sealed this
Twenty-fourth Day of July, 2012

David J. Kappos
*Director of the United States Patent and Trademark Office*